3,523,109
PRODUCTION OF POLYVINYL CHLORIDE OR VINYL CHLORIDE COPOLYMERS HAVING HIGH SOFTENING POINTS
Karl-Heinz Diessel and Gerhard Bier, Troisdorf, Werner Trautvetter, Spich, and Robert Büning, Oberlar, Germany, assignors to Dynamit Nobel Aktiengesellschaft, Troisdorf, Germany, a corporation of Germany
No Drawing. Filed Feb. 18, 1966, Ser. No. 528,367
Claims priority, application Germany, Feb. 20, 1965, D 46,576
Int. Cl. C08f 1/62, 3/30, 15/24
U.S. Cl. 260—87.1                8 Claims

ABSTRACT OF THE DISCLOSURE

Polymers and copolymers of vinylchloride characterized by high Vicat values prepared by polymerizing vinylchloride with water soluble redox systems in the presence of an aliphatic alcohol in an amount of 8 to 20% the weight of the vinylchloride and in the additional presence of an ether and/or ketone, the total quantity of which amounts to 5 to 50% of the weight of the alcohol used.

---

The present invention relates to the production of polymeric and copolymeric vinylchloride having high softening points and more particularly relates to the production of polymeric and copolymeric vinylchloride by polymerization of vinylchloride with water-soluble redox systems in the presence of an aliphatic alcohol and an ether and/or ketone.

It is known that the polymerization of vinyl chloride can be carried out in the presence of tetrahydrofuran at temperatures of about 50° C., the tetrahydrofuran being incorporated into the polymer chain resulting in the formation of a copolymer of 95–98% vinylchloride and 2–5% tetrahydrofuran. It is also in the prior art to polymerize vinyl chloride at temperatures between 0° and 60° C. in the presence of 0.25 to 2 mol. percent of a cyclic ether or ketone, using azodiisobutyronitrile as catalyst. In this procedure, polymers are obtained which are partially amorphous and partially crystalline. It is furthermore in the prior art to conduct the polymerization of vinyl chloride at low temperatures with organometallic catalysts dissolved in cyclic ethers or ketones.

If the prior art redox polymerization of vinyl chloride is conducted with water-soluble redox systems in the presence of aliphatic alcohols in a quantity amounting to about 8 to 20% of the weight of the monomer, polymers having high viscosities, as, for example, $n_{rel}=5.3$, are obtained, with conversions amounting to 80% and greater. Usually polymers of such high viscosities are industrially undesirable. The viscosities can be reduced by increasing the quantity of aliphatic alcohol. This, however, results in technical difficulties, since the end products are no longer obtained in powder form. If the aliphatic alcohols are entirely replaced by ethers or ketones, no polymerization takes place under these conditions.

It is an object of this invention to provide a simple method of producing commercially desirable polymeric and co-polymeric vinyl chloride avoiding the disadvantages of the art.

It is another object of this invention to provide a method of producing polymeric and co-polymeric vinyl chloride having high softening points.

It is a further object of this invention to provide a method of producing polymeric and co-polymeric vinyl chloride characterized by conversions of greater than 80%.

Other objects and advantages of the present invention will be apparent from a further reading of the specification and of the appended claims.

In accordance with the invention it has now been found that polymers and co-polymers having high softening points can be obtained by polymerizing vinyl chloride with water-soluble redox systems, in the presence of an aliphatic alcohol in a quantity of approximately 8 to 20% of the weight of the vinyl chloride, and in the additional presence of an ether and/or ketone, the total quantity of which amounts to approximately 5 to 50% and preferably 5 to 40% of the weight of the alcohol used. Surprisingly it has been found that the polymers produced according to the invention have higher Vicat softening points and lower viscosities than those manufactured without the addition of ethers or ketones. These effects are particularly apparent in the case of polymerization conversions of greater than 30%, more precisely at conversion rates higher than 40% of weight. The resulting Vicat softening points are 3–10 Celsius degrees higher for homopolymerizates of vinylchloride and have relative viscosities according to the described measuring method being 2–3.5 units lower. The Vicat softening points were determined according to the regulations laid down in VDE–Vorschrift No. 0302–3.42, being a regulation of the German electrical engineers.

The ethers used in the process of the invention are advantageously dialkyl ethers having one to eight carbon atoms in the alkyl radicals thereof, such as dimethyl ether, methyl ethyl ether, methyl isopropyl ether, methyl n-propyl ether, diethyl ether, ethyl isopropyl ether, ethyl n-propyl ether, ethyl n-butyl ether, ethyl hexyl ether, ethyl heptyl ether, ethyl isobutyl ether, ethyl isoamyl ether, ethyl octyl ether, di-n-propyl ether, diisopropyl ether, di-n-butyl ether, diisobutyl ether, di-n-amyl ether, diisoamyl ether, di-n-heptyl ether, di-n-octyl ether, and the like, and also cyclic ethers such as tetrahydrofuran or dioxane. The ketones are advantageously aliphatic ketones having alkyl groups containing 1 to 8 carbon atoms such as, for example, acetone or methyl ethyl ketone, diethyl ketone, dipropyl ketone, diisopropyl ketone, dibutyl ketone, diisobutyl ketone, diamyl ketone, diisoamyl ketone, dihexyl ketone, diheptyl ketone, dioctyl ketone, ethyl octyl ketone, ethyl propyl ketone, ethyl butyl ketone, ethyl hexyl ketone, ethyl heptyl ketone, and the like, or cycloaliphatic ketones such as cyclopentanone or cyclohexanone.

The water-soluble redox system, being a ternary mixture, consists of a water-soluble peroxy compound, such as hydrogenperoxide, methyl hydrogenperoxide, peroxy acetic acid and other peroxy acids, a water-soluble reducible organic compound, such as ascorbic acid, isoascorbic acid, dihydroxy acetone, hydrazine, monoacetyl hydrazine, and the like, and a water-soluble metal compound, which is easily transformed from one oxidation form to another, such as compounds of copper, cerium, cobalt, and the like.

The polymerization reaction is conducted in a conventional manner at temperatures of about 0° to about −60° C., and preferably at −10° to about −30° C.

Advantageously, the polymerization is conducted in horizontally revolving cylindrical vessels containing grinding bodies, or in vessels provided with agitators having a shearing action, at conversions of more than 30%.

The polymerization reaction of the invention can also be carried out as a copolymerization using as co-monomer for copolymerization with the vinyl chloride, such monomers as vinyl esters, for instance, vinyl acetate, vinyl propionate, vinyl stearate or vinyl toulate; acrylic acid esters such as acrylic acid ethyl ester or acrylic acid ethyl hexyl ester; itaconic acid esters as exemplified by itaconic acid dimethyl ester; olefins as for example ethylene or propylene. The vinyl chloride copolymers thereby obtained are likewise characterized by elevated softening points and lower relative viscosities.

The following examples are given to illustrate the present invention. The scope of the invention is not, however, meant to be limited to the specific details of the examples.

EXAMPLE 1 (COMPARISON)

There were introduced into an autoclave constructed of nickel having a diameter of 110 mm. and a capacity of 2 liters, 8 balls made of V2A steel, 30 mm. in diameter, as well as 500 g. vinyl chloride, 50 g. methanol and, as catalyst, 0.7 g. ascorbic acid, 2.0 cc. of a 35 wt. percent $H_2O_2$ solution and 0.8 cc. of a 1 wt. percent solution of $Fe_2(SO_4)_3$. The autoclave was rotated at $-15°$ C. in a cold bath at 50 r.p.m., corresponding to an inside peripheral speed of 17.3 m./min. The polymerization conversion amounted to 88%; the relative viscosity of a 1 wt. percent solution of the product (measured in cyclohexanone at 20° C.) was 5.3, and the Vicat softening point (5 kp. load) was 96° C.

EXAMPLE 2

A polymerization run was conducted under the conditions set out in Example 1, with the addition of 10 g. of tetrahydrofuran. The polymerization conversion after 15 hours amounted to 85%, the relative viscosity of the product was 3.3, and the Vicat softening point (5 kp. load) was 102° C.

EXAMPLE 3

A polymerization reaction was carried out following the description given in Example 1, with the addition of 20 g. tetrahydrofuran. The polymerization conversion after 15 hours amounted to 80%, the relative viscosity to 2.9 and the softening point according to Vicat (5 kp. load) was 104° C.

EXAMPLE 4

A polymerization reaction was conducted substantially as set out in Example 1, with the addition of 20 g. dioxane. The polymerization conversion amounted to 82% after 15 hours, the relative viscosity to 3.0 and the Vicat softening point (5 kp. load) was 102° C.

EXAMPLE 5

A polymerization reaction was conducted as described in Example 1, with the addition of 20 g. acetone. The polymerization conversion amounted after 15 hours to 78%, the relative viscosity to 3.2, and the Vicat softening point (5 kp. load) was 102° C.

EXAMPLE 6

The polymerization reaction described in Example 1 was repeated with the addition of 20 g. cyclohexanone. The conversion after 15 hrs. amounted to 72%, the relative viscosity of the product to 3.3, the thermal softening point according to Vicat (5 kp. load) was 101° C.

EXAMPLE 7 (COMPARISON STANDARD)

The polymerization reaction described in Example 1 was repeated with the addition of 50 g. vinyl acetate as a co-monomer. The polymerization amounted after 20 hours to 92%, the relative viscosity of the co-polymer to 3.5 and the Vicat softening point (5 kp. load) to 83° C.

EXAMPLE 8

A polymerization reaction as set out in Example 1 was carried out with the addition of 50 g. vinyl acetate and 20 g. tetrahydrofuran. The polymerization conversion after 20 hours amounted to 90%, the relative viscosity to 2.9 and the Vicat softening point (5 kp. load) to 87° C.

EXAMPLE 9

The polymerization procedure disclosed in Example 1 was repeated with the addition of 10 g. diethyl ether. The polymerization conversion after 15 hours amounted to 80%, the relative viscosity was 3.1, and the Vicat softening point (5 kp. load) was 101° C.

We claim:

1. Process for the production of a member selected from the group consisting of polymers and copolymers of vinylchloride having an elevated Vicat softening point, which comprises polymerizing vinylchloride in the substantial absence of water, with a water-soluble redox system at polymerization rates higher than 40% at temperatures between 0° and $-60°$ C. in the presence of an aliphatic alcohol in a quantity of 8 to 20 wt. percent referred to the monomer and in the presence of a member selected from the group consisting of ethers, ketones, and mixtures thereof, the total quantity of which amounts to about 5 to 50 wt. percent referred to the alcohol used.

2. Process according to claim 1, wherein said polymerization is carried out at temperature of between $-10$ and $-30°$ C.

3. Process according to claim 1, wherein said polymerization is carried out using said ether and/or ketone group member in an amount of 5 to 40 wt. percent of the alcohol.

4. Process according to claim 1, wherein said ether and/or ketone group member is a member selected from group the group consisting of aliphatic ketones, the alkyl groups of which contain 1 to 8 carbon atoms, cyclopentanone and cyclohexanone.

5. Process according to claim 1, wherein said ether and/or ketone group member is an ether selected from the group consisting of dialkyl ethers having alkyl groups containing 1 to 8 carbon atoms, tetrahydrofuran and dioxane.

6. Process according to claim 1, wherein said polymerization reaction is a copolymerization of vinylchloride with a monomer selected from the group consisting of vinyl esters, acrylic acid esters, itaconic acid esters, and olefins.

7. Process according to claim 6, wherein said vinylchloride is polymerized with vinyl acetate.

8. A member selected from the group consisting of polymers and copolymers of vinylchloride having high Vicat softening points produced by the process of claim 1.

References Cited

UNITED STATES PATENTS 2,719,143    9/1955    Van Dijk et al.

FOREIGN PATENTS 1,110,415    7/1961    Germany.
1,111,826    7/1961    Germany.

JOSEPH L. SCHOFER, Primary Examiner

J. A. DONAHUE, JR., Assistant Examiner

U.S. Cl. X.R.

260—78.5, 86.3, 87.5, 92.8